UNITED STATES PATENT OFFICE.

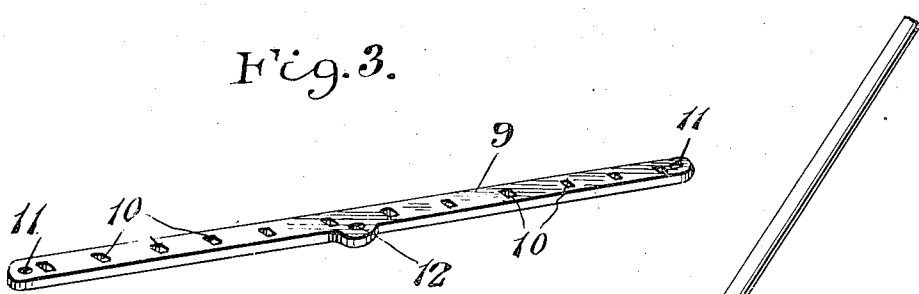
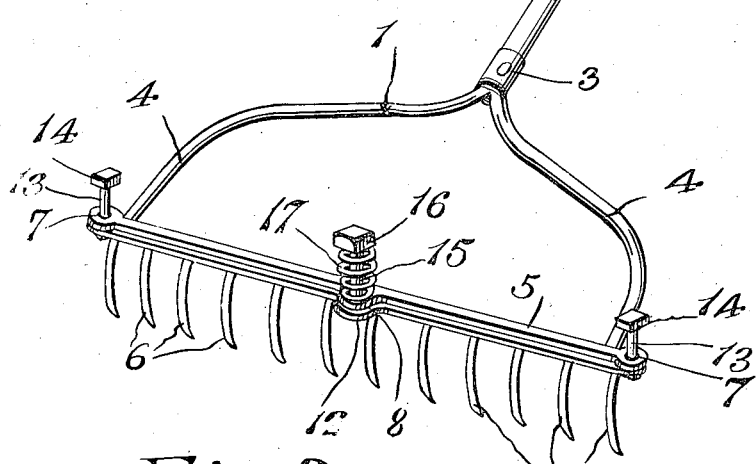
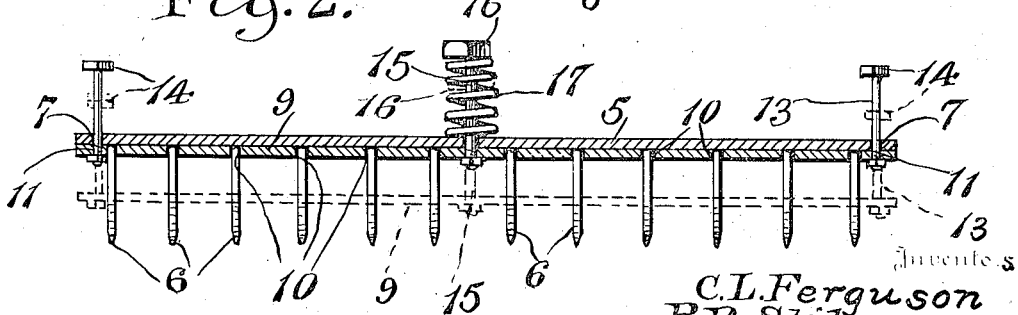

CLARENCE LEROY FERGUSON AND ROBERT B. STITSON, OF SPRINGVALE, MAINE.

SELF-CLEANING RAKE.

1,128,239.   Specification of Letters Patent.   Patented Feb. 9, 1915.

Application filed April 21, 1914. Serial No. 833,534.

*To all whom it may concern:*

Be it known that we, CLARENCE L. FERGUSON and ROBERT B. STITSON, citizens of the United States, residing at Springvale, in the county of York and State of Maine, have invented certain new and useful Improvements in Self-Cleaning Rakes, of which the following is a specification.

Our invention relates to new and useful improvement in rakes and has for its primary object to provide a self-cleaning rake by means of which leaves, trash and other foreign matter may be stripped from the teeth in a reliable and expeditions manner without necessitating the operator touching the trash or other foreign matter to facilitate the removal thereof.

Another important object of our invention is to provide means for stripping the teeth that is normally in inoperative position so as not to interfere with the rake performing its usual function and will automatically move into inoperative position.

Another important object of our invention is to provide a device of the character described that is simple as to construction, reliable and efficient in operation and inexpensive to manufacture.

The above and additional objects are accomplished by such means as are illustrated in the accompanying drawings, described in the following specification and then more particularly pointed out as claimed.

With refernce to the drawings, wherein we have illustrated the preferred embodiment of our invention as it is reduced to practice, and throughout the several views of which similar reference numerals designate corresponding parts: Figure 1 is a perspective view of our improved rake, Fig. 2 is a longitudinal sectional view showing the stripping bar in dotted lines in downmost position, and Fig. 3 is a detail perspective view of the stripping bar.

Referring to the drawings by characters of refernce the numeral 1 designates as an entirety a rake consisting of a handle 2 secured at one end to a socket 3, curved supporting arms 4 that are joined and formed integral at their inner ends with the socket 3 and a rake head 5 having the usual teeth 6 thereon. The outer ends of the arms 4 are preferably formed integral with the end portions of the rake head 5. The rake head 5 is formed with an ear 7 at each end and a central offset ear 8. An elongated stripping bar 9 provided with a plurality of spaced teeth receiving apertures 10 is slidably mounted upon the teeth 6, provided at each end with openings 11 and centrally with an offset ear 12. The openings 11 are designed to aline with the ears 7 and the ears 12 and 8 with each other.

Removably mounted within the openings 11 in the stripping bar 9 are upstanding pins 13 that are slidable through the ears 7 in the ends of the rake head and have enlarged and preferably angular heads 14 formed on their upper terminals.

A central pin 15 is removably mounted within the ear 12, extends upwardly, and is slidable through the ear 8. A large head 16 is formed on the upper terminal of the pin 15. A compression spring 17 of the helical type is mounted upon the pin 15 and at its ends engages the under face of the head 16 and ear 8.

To cleanse the teeth of trash, leaves or other foreign matter, it is only necessary to invert the rake and force the head 16 into engagement with the ground thus causing the stripping bar 9 to move toward the ends of the teeth 6 and remove the foreign matter therefrom. The spring 17 serves to hold the stripping bar in inoperative position and automatically return the bar to such position.

With reference to the foregoing description and accompanying drawings it will be readily seen that we have provided simple and inexpensive means for reliably and expeditiously cleaning rake teeth.

In practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as set forth.

What is claimed is:—

The combination with a rake head having teeth thereon and an ear formed centrally of the ends of said head and being offset and ears on the end of said head of a relatively narrow stripping bar having a plurality of teeth receiving apertures therein slidably mounted upon the teeth, an ear formed centrally of the ends of said stripping bar and being offset and in alinement with the central ear on said rake head, a headed pin having one end threaded mounted rigidly with the stripping bar and extending upwardly through the ear in the head, said threaded end of the pin being turned in the ear intermediate the ends of said stripping bar, a nut turned on the lower end of said pin, a helical expansion spring mounted upon said pin and interposed between the head thereon and the rake head and headed pins secured to the end of said stripping bar and extending through the ears on the ends of said rake head with their heads uppermost.

In testimony whereof we affix our signatures in presence of two witnesses.

CLARENCE LEROY FERGUSON.
   ROBERT B. STITSON.

Witnesses:
 GEORGE A. GOODWIN,
 CHARLES G. GOODWIN.